(12) United States Patent
Menicovich et al.

(10) Patent No.: US 11,936,025 B2
(45) Date of Patent: Mar. 19, 2024

(54) TEMPERATURE CONTROL USING ACTIVE FLOW CONTROL ACTUATORS

(71) Applicant: Actasys, Inc., Brooklyn, NY (US)

(72) Inventors: David Menicovich, Hoboken, NJ (US); Anthony Mickalauskas, Troy, NY (US)

(73) Assignee: Actasys, Inc., Brooklyn, NY (US)

( * ) Notice: Subject to any disclaimer, the term of this patent is extended or adjusted under 35 U.S.C. 154(b) by 504 days.

(21) Appl. No.: 17/136,633

(22) Filed: Dec. 29, 2020

(65) Prior Publication Data

US 2021/0203021 A1     Jul. 1, 2021

Related U.S. Application Data

(60) Provisional application No. 62/954,493, filed on Dec. 29, 2019.

(51) Int. Cl.
*H01M 10/65* (2014.01)
*B60L 58/26* (2019.01)
(Continued)

(52) U.S. Cl.
CPC ......... *H01M 10/6556* (2015.04); *F04B 43/04* (2013.01); *H01M 10/613* (2015.04);
(Continued)

(58) Field of Classification Search
CPC ......... Y02T 10/70; Y02T 90/16; Y02E 60/10; H01M 10/613; H01M 10/625;
(Continued)

(56) References Cited

U.S. PATENT DOCUMENTS

| | | | | |
|---|---|---|---|---|
| 8,490,926 B2* | 7/2013 | Clingman | ................ | F15D 1/12 244/209 |
| 8,931,714 B1* | 1/2015 | Pitt | ........................ | B64C 21/04 239/102.1 |

(Continued)

FOREIGN PATENT DOCUMENTS

| | | |
|---|---|---|
| CN | 103299128 A | 9/2013 |
| CN | 105523186 A | 4/2016 |
| WO | 2017147299 | 8/2017 |

OTHER PUBLICATIONS

International Search Report/Written Opinion issued by the U.S. Patent & Trademark Office as International Search Authority relative to PCT/US2020/067318 dated Mar. 29, 2021; 8 pages.

(Continued)

*Primary Examiner* — Tyler J Lee
(74) *Attorney, Agent, or Firm* — Smith Gambrell & Russell LLP

(57) ABSTRACT

A synthetic jet actuator includes a cavity layer having an internal cavity for reception of a fluid volume and an orifice providing a fluid communication between the cavity and an external atmosphere; an oscillatory membrane having a piezoelectric material adapted to deflect the oscillatory membrane in response to an electrical signal; and a controller configured to control delivery of electrical signals to the piezoelectric material for controlling operation of the oscillatory membrane based on input data received from one or more sources that informs on a temperature and/or performance level of a targeted objected for cooling. The actuator may further include a thermal element for affecting modified temperature control; and the actuator may be integrated into a surface of a thermally diffusive structure for dissipating heat from a thermal load.

20 Claims, 5 Drawing Sheets

(51) Int. Cl.
*F04B 43/04* (2006.01)
*H01M 10/61* (2014.01)
*H01M 10/613* (2014.01)
*H01M 10/62* (2014.01)
*H01M 10/625* (2014.01)
*H01M 10/6556* (2014.01)

(52) U.S. Cl.
CPC ........... *H01M 10/625* (2015.04); *B60L 58/26* (2019.02); *F02D 2200/503* (2013.01); *H01M 2220/20* (2013.01)

(58) Field of Classification Search
CPC ......... H01M 10/6556; H01M 10/6564; H01M 2220/20; F04B 2203/0401; F04B 2203/0402; F04B 2203/0404; F04B 2207/00; F04B 43/04; F04B 45/047; F04B 49/06; F02D 2200/503; B60L 2240/545; B60L 58/26
See application file for complete search history.

(56) References Cited

U.S. PATENT DOCUMENTS

| | | | | |
|---|---|---|---|---|
| 8,974,200 | B2* | 3/2015 | Chan | F04B 43/04 417/480 |
| 9,521,777 | B2 | 12/2016 | Bakk | |
| 9,780,420 | B2* | 10/2017 | Masias | H01M 10/482 |
| 9,803,666 | B2* | 10/2017 | Whalen | F04B 45/047 |
| 10,655,655 | B2* | 5/2020 | Whalen | F04B 45/047 |
| 2010/0051721 | A1* | 3/2010 | Arik | F04B 43/046 29/428 |
| 2010/0258270 | A1 | 10/2010 | Arik et al. | |
| 2011/0162823 | A1 | 7/2011 | Sharma et al. | |
| 2013/0068427 | A1* | 3/2013 | Williams | F04B 43/14 165/121 |
| 2014/0263726 | A1* | 9/2014 | de Bock | F04F 7/00 239/102.2 |
| 2014/0348668 | A1* | 11/2014 | Griffin | F04B 43/00 417/472 |
| 2016/0061194 | A1 | 3/2016 | Refai-Ahmed et al. | |
| 2016/0333904 | A1* | 11/2016 | Whalen | F15D 1/008 |
| 2018/0038364 | A1* | 2/2018 | Dumas | F04B 43/0054 |
| 2018/0061737 | A1 | 3/2018 | Arik et al. | |
| 2021/0009088 | A1 | 1/2021 | Hayashi et al. | |

OTHER PUBLICATIONS

Office Action and Search Report dated May 23, 2023, for Chinese Patent Application No. 2020800951265 (12 Pages in Chinese with 8 pages English Translation).

* cited by examiner

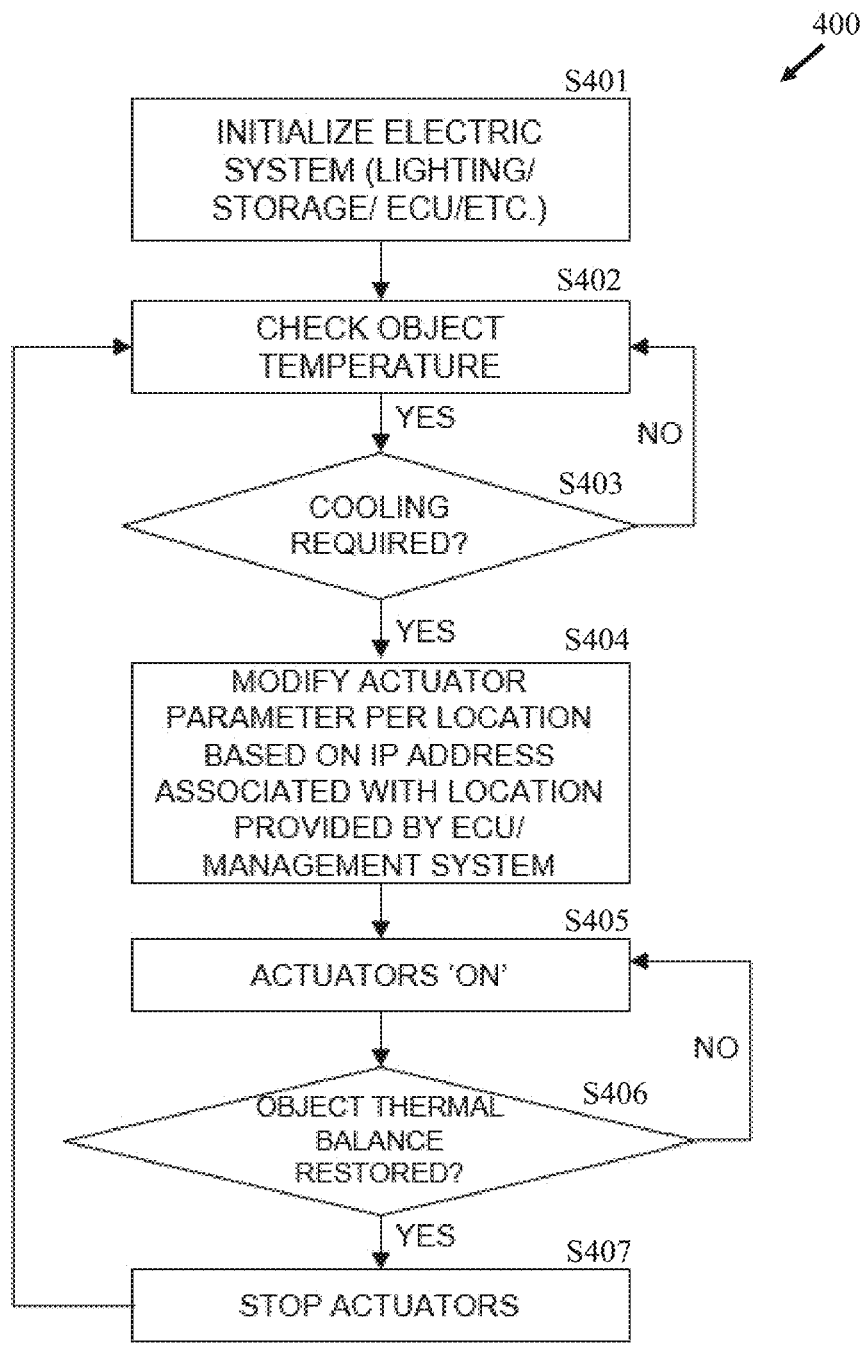

TEMPERATURE CONTROL USING ACTIVE FLOW CONTROL ACTUATORS

FIELD OF THE INVENTION

The present invention relates to synthetic jet actuators and methods of temperature control using the same. In particular, the present invention is directed to improvements in synthetic jet actuators suitable for temperature control in zero net mass flow applications.

BACKGROUND OF THE INVENTION

Vehicles use cooling systems such as forced convection, liquid cooling, and mechanical fans to remove excess heat from the battery to avoid failure. However, conventional cooling systems suffer from several shortcomings.

Conventional cooling systems are incapable of reacting to time and location specific cooling needs, or providing "spot cooling" to reduce risk of local failure; and conventional systems that use conductive mass and forced air cooling, such as large aluminum heatsinks, are heavy and costly, and take up a large volume in areas where space is already limited. Meanwhile, conventional mechanical cooling systems, such as fans, have multiple moving parts without electronic infrastructure for providing performance data, which prevents communications that can provide advance alerts ahead to provide predictive maintenance ahead of a potential failure.

Conventional cooling methods such as forced convection also present limitations, for example, as many modern vehicles are designed to reduce aerodynamic drag for achieving higher energy efficiency and increased range. These designs that deflect airflow as a vehicle travels also minimize the passage of air through the exterior surface of the vehicle and into the interior systems, such as the engine, which is needed of forced convection cooling. As a result, many modern vehicles are designed to effectively "seal" the interior thereof from an outside airflow, thereby decreasing opportunities for internal electronics and electric systems, such as batteries and Electrical Control Units (ECUs), to be cooled via forced air convention, and instead necessitating other cooling systems.

Conventional cooling systems are also incapable of autonomously adapting in real time to changes in thermal conditions and vehicle performance. For example, mechanical fans do not provide sufficient control to respond to a large variety of thermal conditions that may be generated as a vehicle travels through different driving scenarios (e.g., urban versus highway driving environments and conditions), geographies, and seasons.

Conventional cooling systems also often require additional resources and equipment, such as cooling liquid, liquid reservoirs and piping, pumps and other equipment for liquid cooling—with a further dependence on airflow openings to an exterior environment in systems that employ forced air convection. Reliance on additional resources such as these compromises vehicle performance, such as aerodynamics, weight, etc.

There thus remains a need for improvements to cooling systems, and temperature control systems generally.

SUMMARY OF THE INVENTION

A synthetic jet actuator comprises a cavity layer comprising an internal cavity for reception of a fluid volume and an orifice providing a fluid communication between the cavity and an external atmosphere; an oscillatory membrane comprising a piezoelectric material adapted to deflect the oscillatory membrane in response to an electrical signal; and a controller configured to control delivery of electrical signals to the piezoelectric material for controlling operation of the oscillatory membrane.

The cavity has an opening in a planar surface of the cavity layer, and the oscillatory membrane is positioned adjacent to the planar surface having the cavity opening and adapted as an enclosing surface to said cavity opening. The oscillatory membrane is adapted to compress and expand a volume within the cavity, based on a deflection generated by the piezoelectric material, for generating a fluid flow between the cavity and the external atmosphere through the orifice, and the controller is configured to receive input data informing the need for temperature control of a targeted object and to control the delivery of electrical signals to the piezoelectric material for controlling operation of the oscillatory membrane under at least one predetermined parameter for affecting temperature control of the targeted object.

The controller is configured to receive input data informing an approximate temperature or temperature range of the targeted object, and to use the input data to determine at least one parameter for affecting temperature control to achieve a target temperature or target temperature range of the targeted object. The controller is also configured to receive input data informing on a performance level of the targeted object, and to use the input data to determine at least one parameter for affecting temperature control to achieve a target performance level of the targeted object. The controller is configured to control operation of the oscillatory membrane under at least one predetermined parameter chosen from: frequency, amplitude, waveform, phase, duty cycle, and modulation frequency; and to control operation of the oscillatory membrane to alter the at least one predetermined parameter as needed for achieving a target temperature and or a target performance level.

In some examples, the synthetic jet actuator is provided in a vehicle, and the controller is configured to receive input data from at least one on-board vehicle source and/or at least one source external to the vehicle. Non-limiting examples of on-board vehicle sources include: a vehicle electronic control unit (ECU); a data management platform (DMP) of a vehicle cooling system; and a DMP of the targeted object. Non-limiting examples of sources external to the vehicle include: a vehicle-to-vehicle (V2V) communications device at another vehicle or moving platform; one or more transmitters in a network of self-driving vehicles; and a control center that coordinates multiple moving platforms.

In some examples, the synthetic jet actuator further comprises a thermal element provided at the cavity of the cavity layer. The thermal element may be in the form of a heating element that comprises a heating coil, with the controller configured to control a temperature of the thermal element by controlling an electrical power supplied to the heating coil for modifying a temperature of the cavity to enable temperature control of fluid flows ejected from the cavity to the external atmosphere.

In such examples, the controller is configured to activate and control the delivery of electrical signals to the piezoelectric material for operating the oscillatory membrane to affect a temperature control of the targeted object upon receiving input data informing of a need for temperature control of the targeted object, and to determine if there is a need for affecting a modified temperature control of the targeted object to achieve a greater thermal transfer than that possible from operation of the oscillatory membrane alone.

If a determination is made that a modified temperature control is needed, the controller activates and controls a temperature of the thermal element while continuing to control operation of the oscillatory membrane to affect a modified temperature control of the targeted object; and if a determination is made that a modified temperature control is not needed, the controller continues operating the oscillatory membrane to affect a temperature control of the targeted object without operation of the thermal element.

Following activation of the thermal element to affect a modified temperature control, the controller determines if the targeted object has reached a thermal balance for achieving a target temperature or a target performance level. If a determination is made that the targeted object has reached a thermal balance, the controller ceases operation of the thermal element and discontinues modified temperature control of the targeted object; and if a determination is made that the targeted object has not reached a thermal balance, the controller maintains operation of the thermal element for continued modified temperature control of the targeted object.

Following deactivation of the thermal element to cease modified temperature control of the targeted object, the controller determines if thermal balance of the targeted object has been maintained. If a determination is made that thermal balance has not been maintained, the controller reactivates and controls a temperature of the thermal element while continuing to control operation of the oscillatory membrane to renew modified temperature control of the targeted object; and if a determination is made that thermal balance has been maintained, the controller ceases operation of the oscillatory membrane and discontinues temperature control of the targeted object.

In some other examples, the synthetic jet actuator may be integrated into a surface of a thermally diffusive structure for dissipating heat from a thermal load. For example, a synthetic jet actuator may be integrated into a fin of a heatsink. In such an example, the fin is configured as the cavity layer of the synthetic jet actuator, with the cavity formed into the fin with the cavity opening formed in a planar surface of the fin and the orifice formed in an external surface of the fin to provide a fluid communication between the cavity and an external atmosphere, and the oscillatory membrane positioned adjacent to the planar surface of the fin having the cavity opening and adapted as an enclosing surface to said cavity opening.

A plurality of synthetic jet actuators may be integrated into a surface of such a thermally diffusive structure, and may be powered by a common power source and controlled by a common controller. In such examples, the controller may be configured to enable control of individual synthetic jet actuators under custom operational parameters based on a location of the synthetic jet actuator in the structure and a thermal load in the locality of the synthetic jet actuator.

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below:

FIG. 8 shows a process for temperature control using the assembly in FIG. 7.

DETAILED DESCRIPTION OF THE INVENTION

Figure 1:
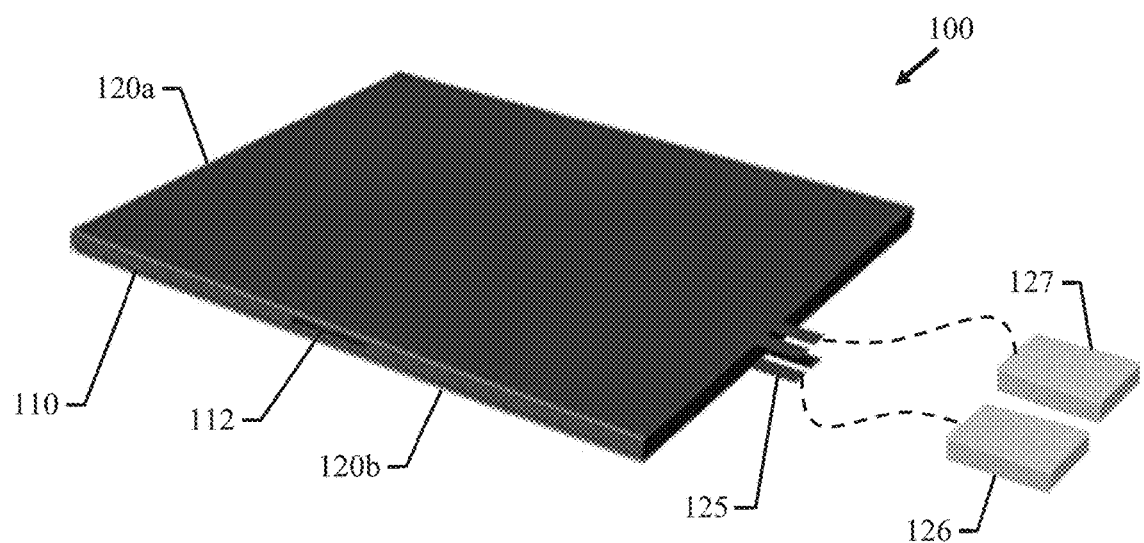
FIG. 1 shows an example of an actuator according to the present invention.

The following disclosure discusses the present invention with reference to the examples shown in the accompanying drawings, though does not limit the invention to those examples.

The use of any and all examples, or exemplary language (e.g., "such as") provided herein is intended merely to better illuminate the invention and does not pose a limitation on the scope of the invention unless otherwise claimed. No language in the specification should be construed as indicating any non-claimed element as essential or otherwise critical to the practice of the invention, unless made clear in context.

As used herein, the singular forms "a," "an," and "the" include plural referents unless the context clearly dictates otherwise. Unless indicated otherwise by context, the term "or" is to be understood as an inclusive "or." Terms such as "first", "second", "third", etc. when used to describe multiple devices or elements, are so used only to convey the relative actions, positioning and/or functions of the separate devices, and do not necessitate either a specific order for such devices or elements, or any specific quantity or ranking of such devices or elements.

The word "substantially", as used herein with respect to any property or circumstance, refers to a degree of deviation that is sufficiently small so as to not appreciably detract from the identified property or circumstance. The exact degree of deviation allowable in a given circumstance will depend on the specific context, as would be understood by one having ordinary skill in the art.

Use of the terms "about" or "approximately" are intended to describe values above and/or below a stated value or range, as would be understood by one having ordinary skill in the art in the respective context. In some instances, this may encompass values in a range of approx. +/−10%; in other instances there may be encompassed values in a range of approx. +/−5%; in yet other instances values in a range of approx. +/−2% may be encompassed; and in yet further instances, this may encompass values in a range of approx. +/−1%.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless indicated herein or otherwise clearly contradicted by context.

Recitations of a value range herein, unless indicated otherwise, serves as a shorthand for referring individually to each separate value falling within the stated range, including the endpoints of the range, each separate value within the range, and all intermediate ranges subsumed by the overall range, with each incorporated into the specification as if individually recited herein.

Unless indicated otherwise, or clearly contradicted by context, methods described herein can be performed with the individual steps executed in any suitable order, including: the precise order disclosed, without any intermediate steps or with one or more further steps interposed between the disclosed steps; with the disclosed steps performed in an order other than the exact order disclosed; with one or more steps performed simultaneously; and with one or more disclosed steps omitted.

The present invention is inclusive of systems and methods for cooling electrical systems in vehicles (e.g., an LIB) using one or more individual actuators or an array of actuators mounted on a vehicle surface or directly on the electrical system of interest (e.g., the interior or exterior of a battery pack or heatsink). In instances where an actuator array is used, the array may be controlled to adapt dynamically to spatial thermal distributions in the targeted electrical system, with the individual actuators controlled by one or more controllers, ECUs, microprocessors, computers, sensors using feedback loops, and combinations of the foregoing.

One application contemplated by the present invention is the cooling of an electrical system, such as an LIB module and/or single LIB cells, to avoid failure, degradation, and inefficacy in performance. As demand for electric vehicles increases, the requirements of LIB performance increases as well as cooling requirements for such systems. Systems and methods according to the present invention may be used alone or as a supplement for enhancing existing cooling systems such as liquid and forced convection systems for LIB cooling. Feedback loops may be used between the system control devices and the battery management system for monitoring the existing systems as well a status of the targeted electrical system for cooling, with the control devices controlling the actuators to maintain optimal performance of the electrical system and balance between use of the electrical system and real-time, dynamic or prescribed performance metrics of the vehicle.

The present invention is inclusive of a cooling system that integrates Active Flow Control (AFC) actuators such as a Synthetic Jet Actuators (SJAs). SJA can be integrated into the vehicle or targeted electrical system for cooling of the same, and may be used as AFC actuators or any other type of actuators such as suction blowing actuators, sweeping jets, fluidic actuators, etc. An actuator array may be integrated into heat sensitive areas and/or areas that are likely to fail as a result of excessive heat. The actuators are data driven, electrical (no need for external air or plumbing) and of sufficiently small size so as to be integrated into the electrical system and/or a surrounding thereof. Being data driven, the actuators receive input data to control their operation and performance, such as switching between on/off states, and changing frequencies and waveforms. Data is provided by controllers, diagnostic systems, electronic control unit (ECU) sensors, battery management systems (BMS), and other feedback loop components.

AFC actuators according to the present invention may be connected in feedback loops to input providers through data management units, such as a controller to control selective activation of actuators in an array with independent performance requirements. For example, a controller may control a driving frequency that is to be used based on a detected temperature range, such as in systems in which different frequencies may impact air mixing differently depending on a surrounding temperature.

By improving cooling of electrical systems in ground, maritime, or flying vehicles, systems and methods according to the present invention are expected to enhance the overall performance, safety, functionality, and energy efficiency of these vehicles.

Figure 2:
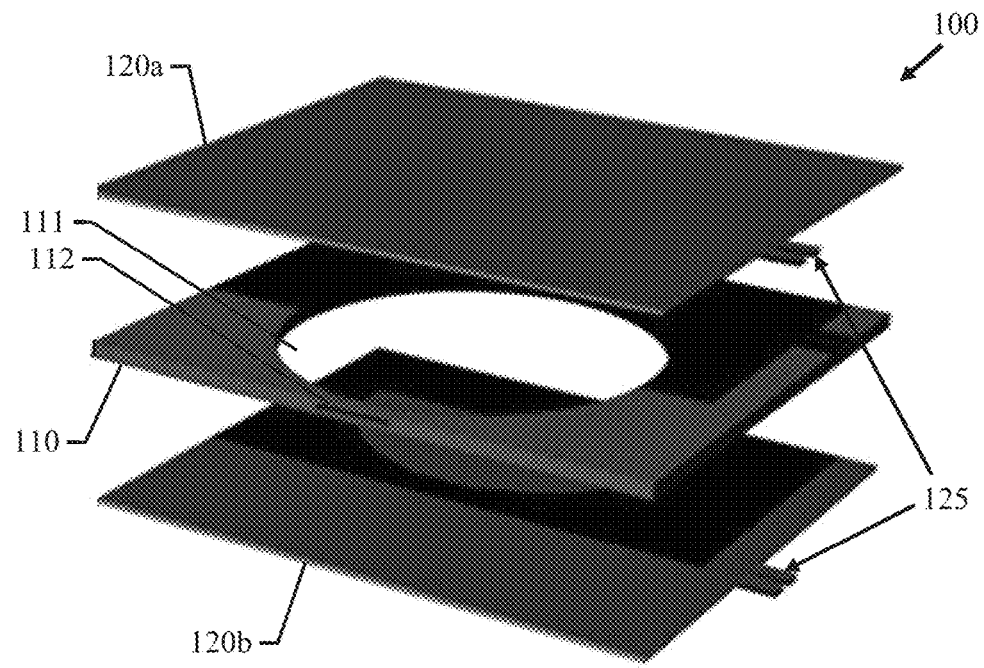
FIG. 2 shows an exploded view of the actuator in FIG. 1.

FIG. 1 shows one example of an AFC actuator 100 according to the present invention, and FIG. 2 shows an exploded view of the separate layers in the actuator 100. Actuators such as the illustrated example are electrically powered and controlled for cooling electrical systems in a vehicle, or a sub-component of a vehicle (e.g., a battery). While FIG. 1 shows only a single actuator 100 having a dedicated power source 126 and controller 127, it will be understood that cooling systems according to the present invention may include one or more actuators for generating jet flows and one or more power sources 126 and controllers 127 for powering and controlling the actuator(s).

As shown in FIGS. 1-2, the actuator 100 comprises a cavity layer 110 that is sandwiched between two oscillatory membrane layers 120a/120b. The cavity layer 110 comprises a body having first and second planar surfaces, an outer perimeter, and an inner perimeter, the inner perimeter defining a cavity 111 within the cavity layer 110. The cavity 111 is open to at least one of the two planar surfaces, and may be open to both planar surfaces. When placed adjacent thereto, an oscillatory membrane layer 120 serves as an enclosing surface over an opening to the cavity 111, thereby defining an enclosed space within the cavity 111 for retention of a fluid volume. The cavity layer 111 further comprises an orifice 112 that provides an airflow path between the cavity 111 and an atmosphere external to the actuator 100 for the intake and output of airflows to and from the cavity 111.

Figure 3:
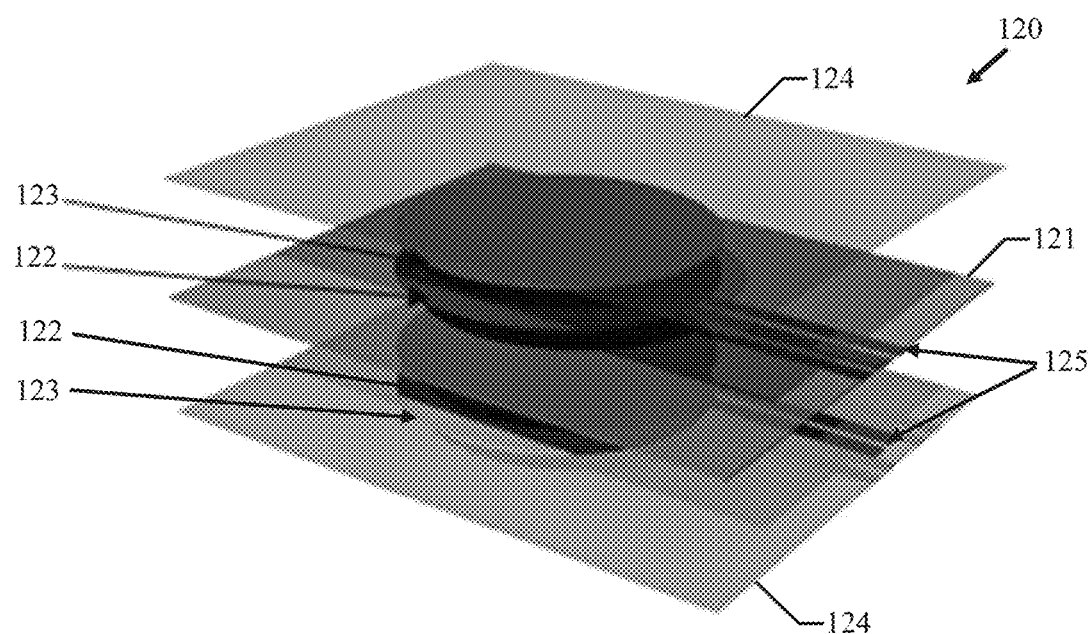
FIG. 3 shows an exploded view of an oscillatory membrane in FIG. 2.

FIG. 3 shows an exploded view of an oscillatory membrane 120, and it is understood that in the example of FIGS. 1-2 both oscillatory membranes 120a/120b have the same structure as shown in FIG. 3. As shown in the illustrated example, the oscillatory membrane 120 comprises a substrate 121 that is integrally coupled to at least one piezoelectric disc 123 by a cohesive bond 122. In the illustrated example, the substrate is coupled to two separate piezoelectric discs 123, one on a top surface and one on a bottom surface, though in other examples there may be only one or the other of these two illustrated piezoelectric discs 123. The cohesive bond 122 may be formed by a one or two part thermoset, such as but not limited to a two part epoxy, a one-part methacrylate, or a low melting metal such as a silver solder. In some examples, the cohesive bond 122 may be formed through a thermosetting film adhesive or "prepreg". In some examples, the cohesive bond 122 may be electrically conductive. The oscillatory membrane 120 may further include outer layers 124 that enclose and secure the several layers therein as a composite oscillatory membrane.

Figure 4:
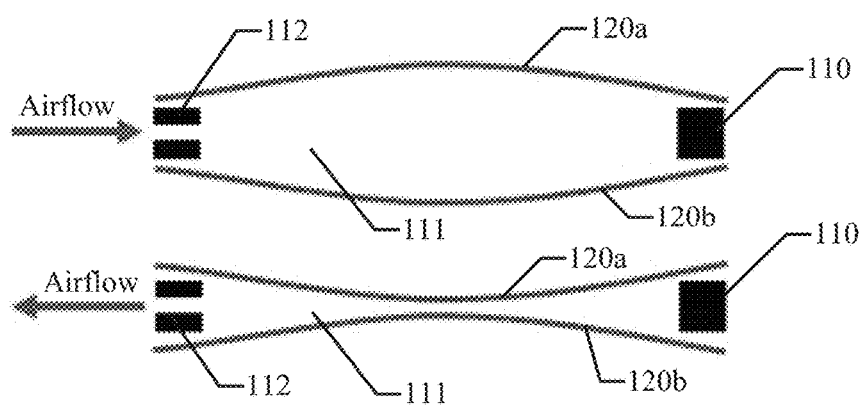
FIG. 4 shows operational states of the actuator in FIG.1, including an expanded cavity operational state (top) and a contracted cavity operation state (bottom)

In use, the piezoelectric disc 123 is operable through supply of an electrical power from a power source 126 (FIG. 1) and control signals provided from a controller 127 via an electrical connection 125. The electrical power and control signals cause the piezoelectric disc 123 to deform, and because of the integral coupling of the disc 123 to the substrate 121, deformation of the disc 123 causes a corresponding deflection of the substrate 121, and thus the oscillatory membrane 120 as whole, in the same direction. As shown in FIG. 4, deformation of the oscillatory membranes 120*a*/120*b* in an outward direction, away from the cavity layer 110, causes an expansion of the cavity 111 that generates an inward airflow through the orifice 112; and deformation of the oscillatory membranes 120*a*/120*b* in an inward direction, toward the cavity layer 110, causes a compression of the cavity 111 that generates an outward airflow through the orifice 112.

Though FIGS. 1-4 show an example of an actuator 100 in which the cavity 111 is in the form of a through-hole with two openings, one at each of the opposite planar surfaces of the cavity layer 110, and two oscillatory membranes 120*a*/120*b* positioned as enclosing surfaces over the separate cavity openings, actuators according to the present invention are not limited to this configuration. The present invention is also inclusive of unimorph actuators, in which the cavity 111 is in the form of a blind-hole with only one opening at a single planar surface of the cavity layer 110, and a single oscillatory membrane 120 positioned as an enclosing surface over the single cavity opening.

Cooling systems according to the present invention may include one or more actuators 100, though may also include actuators of one or more types, including though not limited to synthetic jet actuators, acoustic excitation actuators, plasma actuators, electrically generated sweeping jet actuators, suction and oscillatory blowing (SaOB) actuators, and the like. Operational parameters of the actuators are controlled through software stored in a local memory of the controller 127, and may include though are not limited to actuation frequencies, actuation amplitudes, waveforms, phases, duty cycles, and modulation frequencies. In cooling systems that comprise more than one actuator, additional operational parameters may also be stored in the controller 127, such as the number of actuators, and the number and sequence of actuator operation based on the properties (geometry, structure, and electro-mechanical) and location of the individual actuators. Actuators 100 are powered by electrical power from one or more power supply units 126, which may include one or more power supply units native to the vehicle itself and/or one or more auxiliary power supply units separate from those used by the vehicle.

A single controller 127 may command various cooling system parts through one or more programs stored in a local memory of the controller 127. The controller is also configured to receive input data that informs the need for cooling of one or more electrical systems, and the controller commands the one or more actuators 100 to operate under specific parameters for cooling a targeted electrical system, which may include one of several different pre-stored operational modes. Input data received at the controller 127 may include activation data, informing the controller to activate an actuator for cooling a targeted electrical system; thermal data, informing the controller of an approximate temperature or temperature range of a targeted electrical system which the controller may use to determine appropriate parameters for affecting cooling of the targeted electrical system; and deactivation data, informing the controller to deactivate an actuator to cease cooling of the targeted electrical system. Input data received at the controller 127 may also include performance data, informing on the performance level of the targeted electrical system which the controller may use to determine appropriate parameters for affecting cooling of the targeted electrical system.

The controller 127 may receive input data from a number of different sources, including though not limited to: a vehicle Electronic Control Unit (ECU), and/or sensors thereof; a data management platform (DMP) and/or monitoring sensors provided in the cooling system itself; the one or more electrical systems that the cooling system is configured to cool (e.g., a battery and/or the components thereof). For example, the controller 127 may receive input data from a vehicle ECU that informs on the performance level of a targeted electrical system for cooling, such as a Battery Management System (BMS), for the controller to use in determining appropriate parameters for cooling the BMS. The controller 127 may also receive input data from a DMP of the cooling system that informs on the performance level of one or more actuators 100 in the cooling system for the controller 127 to use in determining optimal operation parameters for the respective actuator(s) 100.

The controller 127 may also receive input data from sources external to the cooling system and the vehicle as a whole. For example, a vehicle-to-vehicle (V2V) communications device may be used to transmit to the controller 127 input data that is generated by another nearby vehicle or moving platform, data generated by a network of self-driving vehicles, and/or data generated by a control center that coordinates multiple moving platforms.

The controller 127 may use input data from one or more sources, as well as a combination of all foregoing sources, to adapt the performance of one or more actuators 100 to achieve any number of goals, including though not limited to cooling system performance, overall vehicle performance, environmental conditions and/or limitations, and passenger preferences. The controller 127 may also record received input data on a storage device that may be either a locally integrated and fixed memory within the cooling system or a removable memory that is separable from the cooling system. Input data may optionally be recorded with concurrent recordings of system diagnostics and/or system input and output data; and the controller 127 may also be configured to broadcast received input data, as well as system diagnostics and/or system input and output data, for uploading to one or more external sources.

Figure 5:
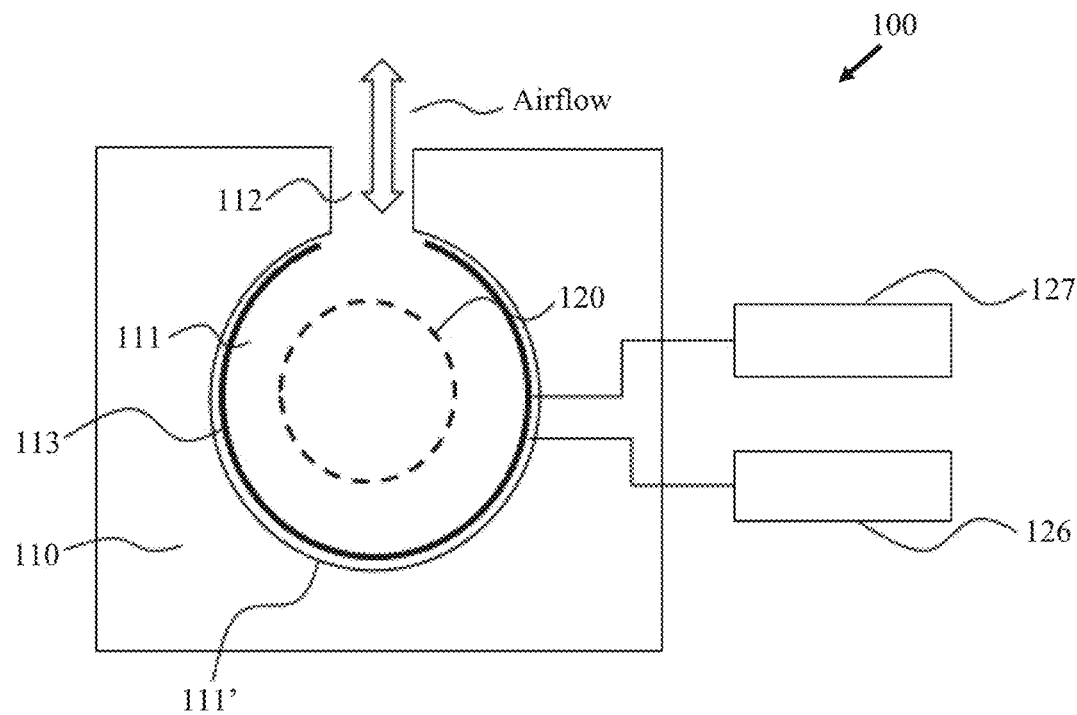
FIG. 5 shows the actuator of FIG. 1 with a thermal element in the cavity thereof.

FIG. 5 shows an example of an actuator 100 with an integrated thermal element 113 positioned in the cavity 111 of the cavity layer 110. The thermal element 113 may extend along a boundary surface 111' of the cavity 111, or may be embedded shallowly below the boundary surface 111'. With inclusion of the thermal element 113, the actuator 100 is made capable of providing greater temperature control over airflows generated by the actuator 100, and thus capable of affecting a greater temperature control over a targeted electrical system (e.g., LIB batteries, ECUs, LEDs, headlights, heatsinks, etc.) with a temperature range beyond that otherwise possible.

Conventional actuators cool objects by generating an airflow jet that increases air mixing around a targeted object to increase heat flux for the removal of heat from a surface of the targeted object and into the surrounding air. Synthetic jet actuators are zero net mass flux (ZNMF) in that they generate pulsed airflow jets by generating an inward airflow to draw air from a surrounding environment into the cavity 111, and then generate an outward airflow to eject air from the cavity 111 at a targeted location as an airflow jet. As ZNMF actuators rely on a surrounding air for generation of airflow jets, the temperature of the airflow jets are strongly influenced by the temperature of the surrounding environment, often with insignificant deviation.

With inclusion of a thermal element 113 in the form of a heating element, such as an electric heating coil in communication with the power source 126, the controller 127 is capable of controlling a voltage and current of the power source 126 to heat the thermal element 113 for selectively modifying a temperature inside the cavity 111 of the actuator 100, and thus a temperature of airflows generated therefrom.

Figure 6:
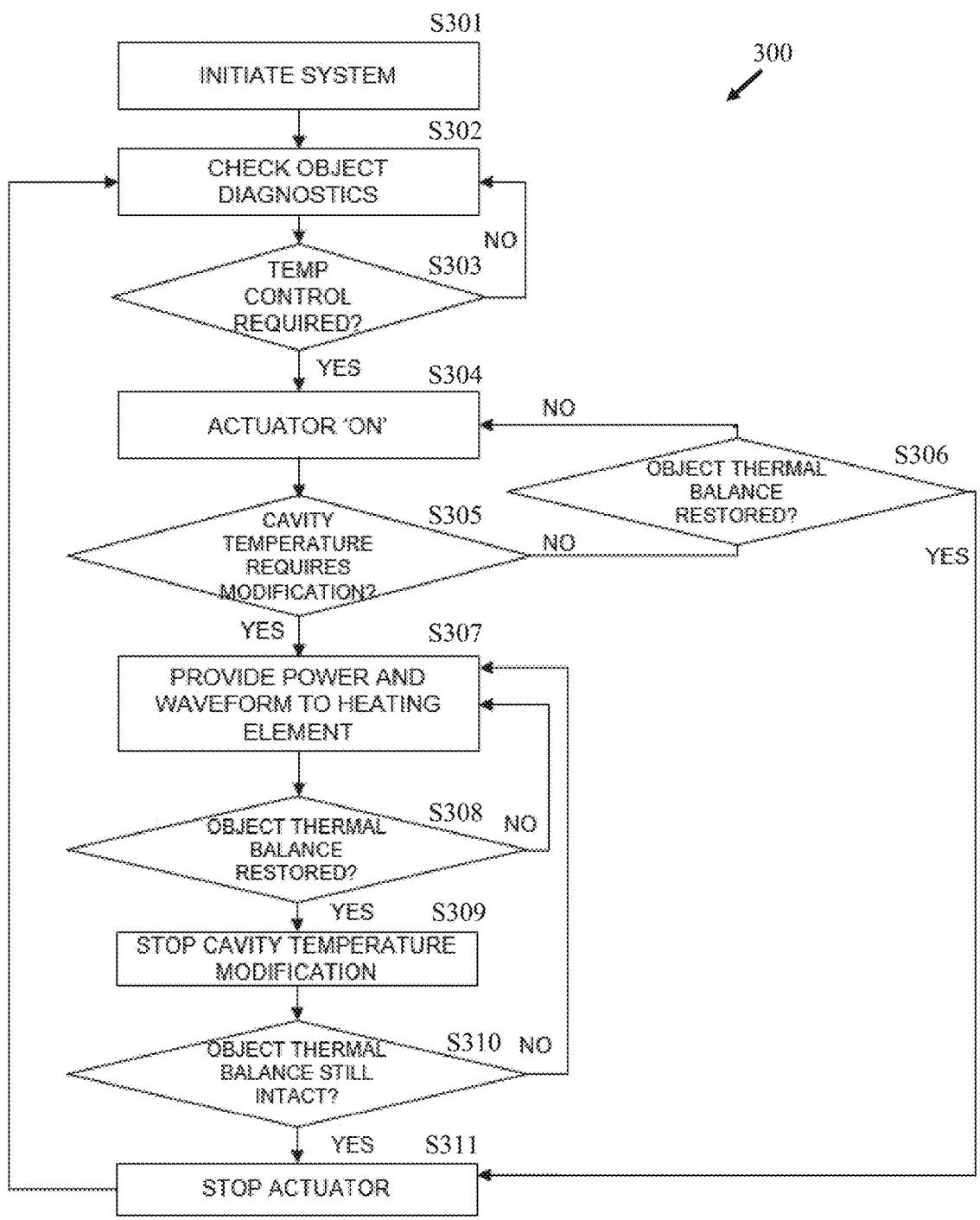
FIG. 6 shows a process for temperature control using the actuator of FIG. 5.

FIG. 6 provides one example of a temperature control process 300 using an actuator 100 that is provided with a thermal element 113 in the form of a heating element. In this example, an actuator 100 is configured for affecting temperature control of an electrical system or other target object, and the controller 127 is configured to receive input data informing on the need for temperature control of the target object, for example from a management system associated with the target object. Upon initiating the cooling system (step S301), the controller 127 will periodically check input data informing on the target object diagnostics (step S302) to determine if temperature control is required (step S303). If it is determined that temperature control is not required (step S303, "NO"), then the process will forego activation of the actuator 100 and will periodically check input data informing on the target object diagnostics (step S302) to again determine if temperature control becomes necessary (step S303). If it is determined that temperature control is required (step S303, "YES"), then the controller 127 activates the actuator 100 (step S304) to control the target object's temperature by generating an airflow jet directed at the target object for influencing a temperature modification thereof. The controller 127 will then use input data informing on diagnostics of the target object to determine if additional temperature modification is required to the target object that will necessitate airflow jets of elevated temperatures (step S305). If the controller 127 determines that additional temperature modification is not required (step S305, "NO"), then the controller will forego activation of the thermal element 113 and will subsequently determine if a thermal balance of the target object has been restored (step S306). If the controller 127 determines that thermal balance has been restored (step S306, "YES"), then the controller 127 will deactivate the actuator 100 (step S311). If the controller 127 determines that thermal balance has not yet been restored (step S306, "NO"), then the controller 127 will maintain activation of the actuator 100 (step S304) and will periodically determine if additional temperature modification is required that necessitates airflow jets of elevated temperatures (step S305) and if a thermal balance of the target object has been restored (step S306).

If it is determined that additional temperature modification is required that necessitates airflow jets of elevated temperatures (step S305, "YES"), then the controller 127 activates the thermal element 113 by supplying a power and waveform for heating the thermal element 113 (step S307), thereby heating cavity 111 such that the actuator 100 generates heated airflow jets of elevated temperature for enhancing a rate of temperature modification of the target object. The controller 127 will subsequently determine if a thermal balance of the target object has been restored (step S308). If the controller 127 determines that thermal balance has not been restored (step S308, "NO"), then the controller will continue to heat the thermal element 113 (step S307) and will periodically check to see if a thermal balance has been restored (step S308). Once the controller 127 determines that a thermal balance has been restored to the target object (step S308, "YES"), then the controller will cease heating of the thermal element (step S309) and will subsequently determine if a thermal balance of the target object remains intact following deactivation of the thermal element 113 (step S310).

If it is determined that thermal balance was not maintained following deactivation of the thermal element 113 (step S310, "NO"), then the controller 127 will reactivate the thermal element 113 by again supplying a power and waveform for heating the thermal element 113 (step S307), and will thereafter periodically determine if a thermal balance of the target object has been restored (step S308), with eventual deactivation of the thermal element (step S309) and a further determination as to whether a thermal balance of the target object remains intact following deactivation of the thermal element 113 (step S310). Upon determining that the thermal balance of the target object remains intact following deactivation of the thermal element 113 (step S310, "YES"), the controller 127 will then deactivate the actuator 100 and will return to periodically checking input data informing on the target object diagnostics (step S302) to determine if temperature control is again required (step S303).

The process 300 has a number of applications for effecting enhanced temperature modifications, such as, for example, melting frost from LIDAR transmission surfaces and melting snow that is blocking a RADAR sensor. In addition, the controller 127 may also monitor diagnostics of the actuator 100 itself, and may use the process 300 to enhance performance of the actuator 100 as needed. For example, deflection of the oscillatory membranes 120 is needed for drawing and ejecting airflows into and out from the cavity 111, through the orifice 112, and that deflection of the oscillatory membranes 120 is achieved via operation of the piezoelectric discs 123 which are temperature-sensitive. Thus, if the controller 127 determines that the actuator 100 is operating at a sub-optimal level, then the controller 127 may determine that operation can be improved by heating the thermal element 113 to increase a temperature of the cavity 111, and thereby increasing a temperature of the piezoelectric discs 123 within the adjacent oscillatory membranes 120 to a temperature that optimizes performance of the piezoelectric discs 123, and thus the actuator 100 as a whole (e.g., in achieving target jet velocities).

In some instances, heating the piezoelectric discs 123 via activation of the thermal element 113 may not result in increased performance of the actuator 100, but may be performed nonetheless if the controller 127 determines that operation of the actuator 100 in the heated state may achieve the same results as operation in a non-heated state, though with a lower power demand (e.g., due to the oscillatory membranes 120 moving with substantially the same character, though with less energy consumption).

Figure 7:
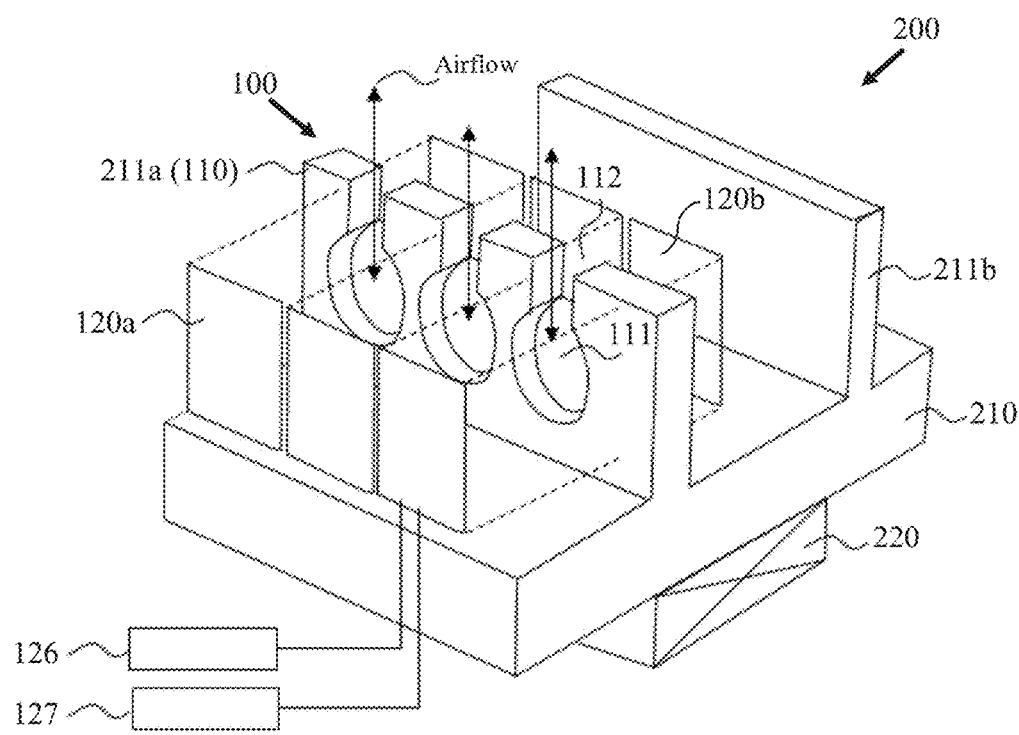
FIG. 7 shows an assembly of a heatsink with actuators as in FIG. 1 integrated therein.

FIG. 7 shows an assembly 200 in which multiple actuators 100 are integrated into a heatsink 210 of an object requiring temperature control (i.e., a thermal load 220). A heatsink is a passive heat exchanger that is designed to be placed in contact with a targeted object that requires thermal cooling, such as an electronic or mechanical device, and to provide an increased surface area through which the targeted object can transfer heat to a surrounding cooling medium, such as air or a liquid coolant, where the heat is then dissipated away from the targeted object allowing regulation of the object's temperature. Heatsinks are commonly used with high-power semiconductor devices such as power transistors and optoelectronics such as LIDAR sensors for ADAS and LEDs for headlamps, where the heat dissipation ability of the component itself is insufficient to moderate its temperature.

The assembly in FIG. 7 presents one example showing actuators 100 according to the present invention integrated into a heatsink 210 for enhancing efficacy of the heatsink in dissipating heat from a thermal load 220 that is in contact with the heatsink. In this example the heatsink 210 is provided with two fins 211, and actuators 100 are integrated into only a first fin 211a, though it will be understood that in other examples actuators may be integrated into the second fin 211b as well as any further fin 211 provide on the heatsink 210. The fin 211a is provided with three cavities 111 formed therethrough and serves as a cavity layer 110 to each of the actuators 100. Three separate pairs of oscillatory membranes 120a/120b are positioned on opposite sides of the fin 211a, in alignment with the respective cavities 111. FIG. 7 shows a single power source 126 and controller 127, and it will be understood that the illustrated power source 126 and controller 127 may be in communication with and control each of the actuators 100, or that a separate power source and/or controller may be provided for each individual actuator 100.

With the actuators 100 formed in the fin 211a, a boundary surface 111' of each cavity 111 will thus present an increased surface area contact between the heatsink 210 and the surrounding air. This increased surface area increases the passive dissipating capability of the heatsink 210, which is enhanced even more significantly by the operation of each actuator 100. When an actuator 100 draws an airflow from the surrounding environment into a respective cavity 111, that air is then brought into contact with a corresponding boundary surface 111' for the dissipation of heat from the fin 211a to the air, and ejection of that air from the cavity 111 as an airflow jet then removes the transferred heat from the heatsink 210. In this way, operation of the integrated actuators 100, with its cyclical airflow suction and blowing operation, promotes a higher air exchange rate with the fin 211a, which in turn yields a higher heat transfer rate for removing heat from the heatsink 210 and thus from the thermal load 220.

FIG. 8 shows a process 400 that may be used for operating the actuators 100 in FIG. 7, with the thermal load 220 representing a targeted object for cooling. In this example, the actuators 100 are configured for affecting temperature control over the thermal load 220 through heat dissipation via the heatsink 210, and the controller 127 is configured to receive input data informing on the need for temperature control of the thermal load 220, for example from a management system associated with the thermal load 220. Upon initiating the cooling system (step S401), the controller 127 will periodically check input data informing on a temperature of the thermal load 220 (step S402) to determine if cooling is required (step S403). If it is determined that cooling is not required (step S403, "NO"), then the process will forego activation of the actuators 100 and will continue to periodically check input data informing on the temperature of the thermal load 220 (step S402) to determine if cooling becomes necessary (step S403).

If it is determined that cooling is required (step S403, "YES"), the controller 127 determines specific operational parameters for controlling each actuator 100 based on an IP address associated with a location of each actuator 100 provided by the management system and a thermal load in the locality of each synthetic jet actuator (step S404), and activates the actuators 100 to begin operating in accord with the determined parameters (step S405). Subsequently, the controller 127 determines if a thermal balance of the thermal load 220 has been restored (step S406). If the controller 127 determines that thermal balance not been restored, then the controller 127 maintains activation of the actuators 100 (step S405) and continues to periodically determine if a thermal balance of the thermal load 220 has been restored (step S406). Once it is determined that a thermal balance of the thermal load 220 has been restored (step S406, "YES"), then the controller 127 deactivates the actuators 100 (step S407) and returns to periodically checking input data informing on the temperature of the thermal load 220 (step S402) to determine if cooling is again required (step S403).

In the process 400, the controller 127 may control the power, frequency and waveform of each actuator 100 separately, such that heat dissipation through the heatsink 210 is adaptively controlled based on the thermal load 220, which may be any suitable device, such as though not limited to an LED, LIDAR or other object requiring heat dissipation.

Although the present invention is described with reference to particular embodiments, it will be understood to those skilled in the art that the foregoing disclosure addresses exemplary embodiments only; that the scope of the invention is not limited to the disclosed embodiments; and that the scope of the invention may encompass additional embodiments embracing various changes and modifications relative to the examples disclosed herein without departing from the scope of the invention as defined in the appended claims and equivalents thereto.

While a number of the foregoing examples forego illustration and/or discussion of certain elements that are discussed in other examples, it will be understood that each example may include or be made to include elements from one or more other examples. For instance, while some examples forego illustration and/or explicit discussion of a cohesive bond layer and/or an outer layer (such as cohesive bond 122 and outer layers 124 in FIG. 3) it will be understood that each example discussed herein may include these elements. Furthermore, though the foregoing examples are discussed relative to an airflow, it will be understood that jet actuators according to the present invention are not limited to air and the generation of an airflow, and may be used with any suitable fluid for the generation of a corresponding fluid flow.

To the extent necessary to understand or complete the disclosure of the present invention, all publications, patents, and patent applications mentioned herein are expressly incorporated by reference herein to the same extent as though each were individually so incorporated. No license, express or implied, is granted to any patent incorporated herein.

The present invention is not limited to the exemplary embodiments illustrated herein, but is instead characterized by the appended claims, which in no way limit the scope of the disclosure.

What is claimed is:

1. A synthetic jet actuator comprising:
a cavity layer comprising an internal cavity for reception of a fluid volume and an orifice providing a fluid communication between the cavity and an external atmosphere;
an oscillatory membrane comprising a piezoelectric material adapted to deflect the oscillatory membrane in response to an electrical signal;
and a controller configured to control delivery of electrical signals to the piezoelectric material for controlling operation of the oscillatory membrane, wherein the cavity has an opening in a planar surface of the cavity layer, and the oscillatory membrane is positioned adjacent to the planar surface having the cavity opening and adapted as an enclosing surface to said cavity opening,
the oscillatory membrane is adapted to compress and expand a volume within the cavity, based on a deflection generated by the piezoelectric material, for generating a fluid flow between the cavity and the external atmosphere through the orifice, and
the controller is further configured to receive input data informing the need for temperature control of a targeted object and to control the delivery of electrical signals to the piezoelectric material for controlling operation of the oscillatory membrane under at least one predetermined parameter for affecting temperature control of the targeted object.

2. The synthetic jet actuator according to claim 1, wherein the controller is configured to receive input data informing an approximate temperature or temperature range of the targeted object, and to use the input data to determine at least one parameter for affecting temperature control to achieve a target temperature or target temperature range of the targeted object.

3. The synthetic jet actuator according to claim 1, wherein the controller is configured to receive input data informing on a performance level of the targeted object, and to use the input data to determine at least one parameter for affecting temperature control to achieve a target performance level of the targeted object.

4. The synthetic jet actuator according to claim 1, wherein the controller is configured to control operation of the oscillatory membrane under at least one predetermined parameter chosen from: frequency, amplitude, waveform, phase, duty cycle, and modulation frequency.

5. The synthetic jet actuator according to claim 4, wherein the controller is configured to control operation of the oscillatory membrane to alter the at least one predetermined parameter as needed for achieving a target temperature and or a target performance level.

6. The synthetic jet actuator according to claim 1, wherein the synthetic jet actuator is provided in a vehicle, and the controller is configured to receive input data from at least one on-board vehicle source.

7. The synthetic jet actuator according to claim 6, wherein the controller is configured to receive input data from at least one on-board vehicle source chosen from: a vehicle electronic control unit (ECU); a data management platform (DMP) of a vehicle cooling system; and a DMP of the targeted object.

8. The synthetic jet actuator according to claim 1, wherein the synthetic jet actuator is provided in a vehicle, and the controller is configured to receive input data from at least one source external to the vehicle.

9. The synthetic jet actuator according to claim 8, wherein the controller is configured to receive input data from at least one source external to the vehicle chosen from: a vehicle-to-vehicle (V2V) communications device at another vehicle or moving platform; one or more transmitters in a network of self-driving vehicles; and a control center that coordinates multiple moving platforms.

10. The synthetic jet actuator according to claim 1, further comprising:
a thermal element provided at the cavity of the cavity layer, wherein
the controller is further configured to control a temperature of the thermal element for modifying a temperature of the cavity to enable temperature control of fluid flows ejected from the cavity to the external atmosphere.

11. The synthetic jet actuator according to claim 10, wherein
the controller is further configured to activate and control the delivery of electrical signals to the piezoelectric material for operating the oscillatory membrane to affect a temperature control of the targeted object upon receiving input data informing of a need for temperature control of the targeted object,
the controller is further configured to determine if there is a need for affecting a modified temperature control of the targeted object to achieve a greater thermal transfer than that possible from operation of the oscillatory membrane alone, and the controller is further configured such that:
if a determination is made that a modified temperature control is needed, to activate and control a temperature of the thermal element while continuing to control operation of the oscillatory membrane to affect a modified temperature control of the targeted object, and
if a determination is made that a modified temperature control is not needed, to continue operating the oscillatory membrane to affect a temperature control of the targeted object without operation of the thermal element.

12. The synthetic jet actuator according to claim 11, wherein:
the controller is further configured, following activation of the thermal element to affect a modified temperature control, to determine if the targeted object has reached a thermal balance for achieving a target temperature or a target performance level, and the controller is further configured such that:
if a determination is made that the targeted object has reached a thermal balance, to cease operation of the thermal element and discontinue modified temperature control of the targeted object, and
if a determination is made that the targeted object has not reached a thermal balance, to maintain operation of the thermal element for continued modified temperature control of the targeted object.

13. The synthetic jet actuator according to claim 12, wherein:
the controller is further configured, following deactivation of the thermal element to cease modified temperature control of the targeted object, to determine if thermal balance of the targeted object has been maintained, and the controller is further configured such that:
if a determination is made that thermal balance has not been maintained, to reactivate and control a temperature of the thermal element while continuing to control operation of the oscillatory membrane to renew modified temperature control of the targeted object, and
if a determination is made that thermal balance has been maintained, to cease operation of the oscillatory membrane and discontinue temperature control of the targeted object.

14. The synthetic jet actuator according to claim 10, wherein:
the thermal element comprises a heating coil and the controller is configured to control a temperature of the thermal element by controlling an electrical power supplied to the heating coil.

15. A thermally diffusive structure for dissipating heat from a thermal load, comprising:
a synthetic jet actuator according to claim 1 integrated into a surface of the thermally diffusive structure.

16. The thermally diffusive structure according to claim 15, wherein
the thermally diffusive structure is a heatsink and the synthetic jet actuator is integrated into a fin of the heatsink.

17. The thermally diffusive structure according to claim 16, wherein the fin of the heatsink is configured as the cavity layer of the synthetic jet actuator, with the cavity formed into the fin with the cavity opening formed in a planar surface of the fin and the orifice formed in an external surface of the fin to provide a fluid communication between the cavity and an external atmosphere, and the oscillatory membrane is positioned adjacent to the planar surface of the fin having the cavity opening and adapted as an enclosing surface to said cavity opening.

18. The thermally diffusive structure according to claim 15, wherein
a plurality of synthetic jet actuators are integrated into a common fin of the heatsink.

19. The thermally diffusive structure according to claim 18, wherein
multiple synthetic jet actuators are powered by a common power source and controlled by a common controller.

20. The thermally diffusive structure according to claim 19, wherein
the controller is configured to enable control of individual synthetic jet actuators under custom operational parameters based on a location of the synthetic jet actuator in the heatsink and a thermal load in the locality of the synthetic jet actuator.

* * * * *